C. W. FRANCIS.
OIL GUARD.
APPLICATION FILED FEB. 18, 1922.
1,429,942.
Patented Sept. 26, 1922.
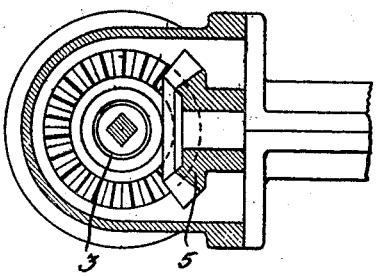
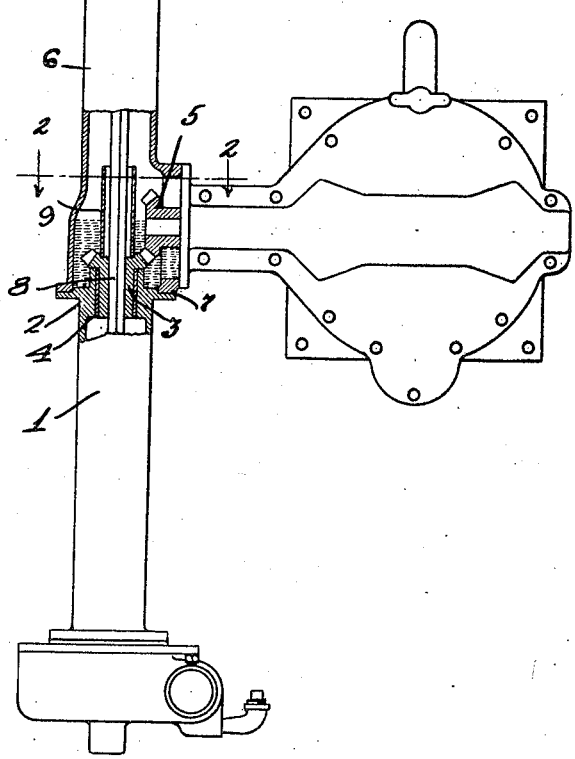
Witnesses
Inventor
CHARLES. W. FRANCIS Patented Sept. 26, 1922.

1,429,942

UNITED STATES PATENT OFFICE.

CHARLES W. FRANCIS, OF PATERSON, NEW JERSEY, ASSIGNOR TO GILLESPIE EDEN CORPORATION, A CORPORATION OF DELAWARE.

OIL GUARD.

Application filed February 18, 1922. Serial No. 537,474.

*To all whom it may concern:*

Be it known that I, CHARLES W. FRANCIS, a citizen of the United States, and a resident of the city of Paterson, in the county of Passaic and State of New Jersey, have invented certain new and useful Improvements in an Oil Guard; and I do hereby declare that the following is a full, clear and exact description of the same, reference being had to the accompanying drawings, and to the numerals of reference marked thereon, which form a part of this specification.

This invention relates to oil guards for transmission mechanism, and it is an object of this invention to provide a guard that will prevent seepage of lubricant and at the same time allow the proper parts to be lubricated.

This invention comprises the novel mechanism hereinafter described and particularly pointed out and defined in the appended claims.

In the accompanying drawings, which illustrate a preferred embodiment of this invention and in which similar reference numerals refer to similar features in the different views:

Figure 1 is an elevational view of a washing machine driving mechanism with parts broken away.

Figure 2 is a section on the line 2—2 of Figure 1.

In the drawings, I have illustrated a vertical casing 1 having a bearing 2 at its upper end in which the hub of a gear 3 is rotatably mounted. A brass sleeve 4 may surround the hub of the gear 3 to produce a smooth bearing. A gear 5 secured to the shaft of a washing machine meshes with the gear 3 and a casing 6 is secured upon the casing 1 and provided with an aperture 7 through which the gear 5 and its shaft extend.

The gear 3 is provided with a polygonal opening through which a polygonal shaft 8 extends. This shaft extends upwardly through the casing 6 and is adapted for operating a wringer. The casing 6 forms a lubricant chamber at its lower end, so that the gears 3 and 5 may be kept emersed in oil, and this oil will seep through the opening of gear 3 unless prevented. According to my invention, a cylindrical or hollow guard 9 is secured upon the upper surface of gear 3 so as to surround the shaft 8 and extend above the lubricant chamber, and rotate with the gear 3, whereby any possibility of oil or lubricant seeping down the shaft 8 is prevented.

I am aware that numerous details of construction may be varied through a wide range without departing from the principles of this invention, and I therefore do not purpose limiting the patent granted otherwise than necessitated by the prior art.

I claim as my invention:

1. In a gearing transmission, a cylindrical vertical casing having a central bearing aperture, a gear having a hub journalled in said aperture whereby an oil chamber is formed above said bearing in which said gear revolves, a shaft extending through said gear, and a hollow oil guard surrounding said shaft in spaced relation thereto and secured in the top of said gear and extending above said oil chamber.

2. In a gearing transmission, a housing having a bearing defined by the inner wall thereof, a rotatable gear having its hub journalled in said bearing whereby a lubricant chamber is formed around said gear, a shaft extending through said gear, and a hollow oil guard surrounding said shaft in spaced relation thereto within said chamber and secured to said rotatable gear and extending beyond the oil in said chamber.

In testimony whereof I have hereunto subscribed my name in the presence of two subscribing witnesses.

CHARLES W. FRANCIS.

Witnesses:
R. ALBERT HEATHWOOD,
BETTY H. HAMILTON.